May 29, 1951     W. B. CRANE     2,554,489
POWDER BOX AND DISPENSER
Filed April 17, 1950
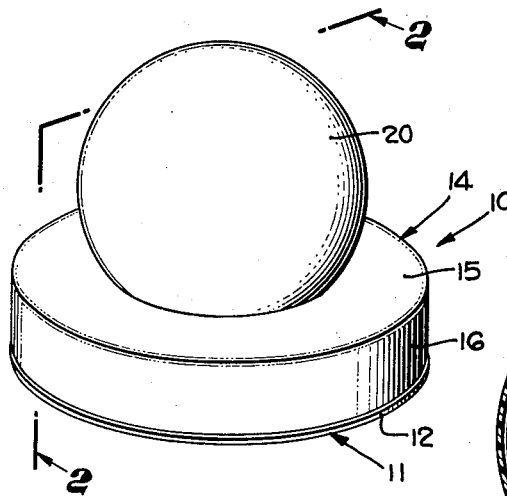
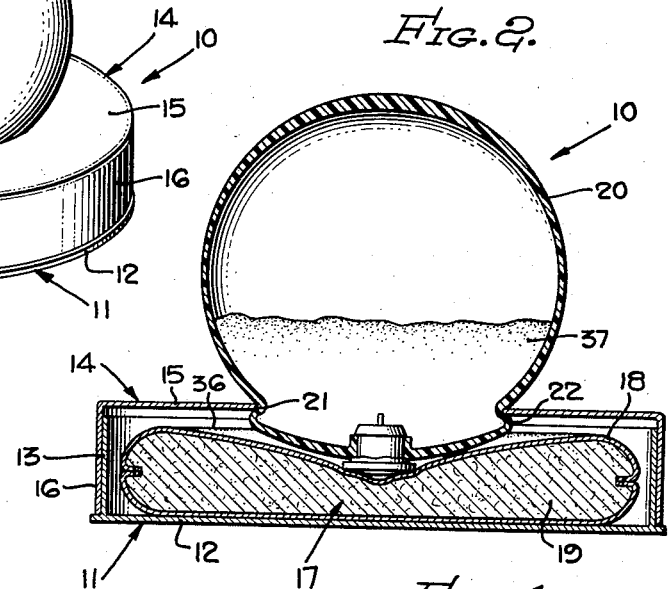
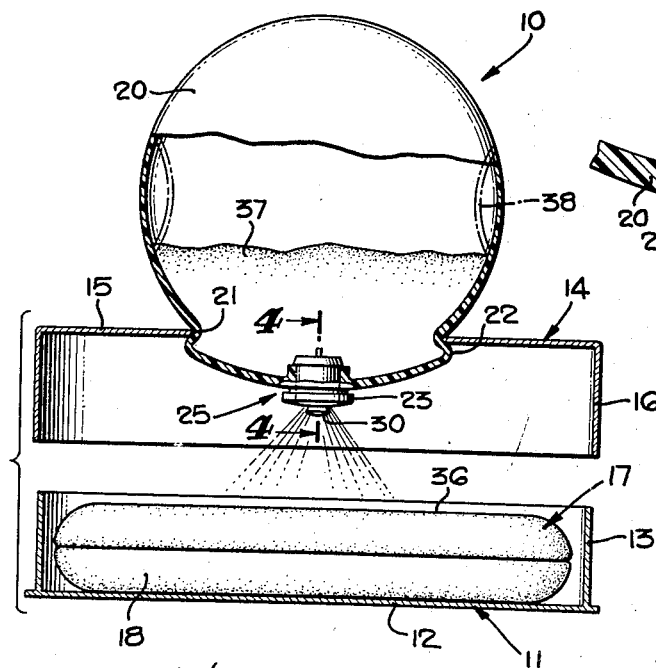
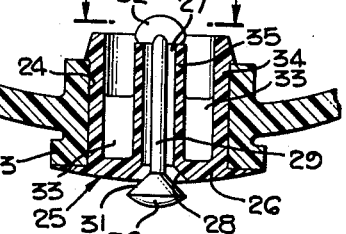
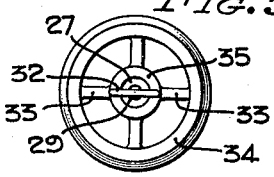
WALTON B. CRANE,
INVENTOR.
BY
ATTORNEYS Patented May 29, 1951

2,554,489

UNITED STATES PATENT OFFICE 2,554,489

POWDER BOX AND DISPENSER

Walton B. Crane, Beverly Hills, Calif., assignor to Max Factor & Co., Los Angeles, Calif., a corporation of Delaware Application April 17, 1950, Serial No. 156,464

7 Claims. (Cl. 132—82)

This invention relates to cosmetic containers and dispensers and is particularly directed to an improved form of powder box and powder dispenser. This invention is useful in connection with powder containers which are formed wholly or partly of a semi-plastic material such as, for example, polyethylene.

Conventional powder boxes for bath powder and dusting powder commonly employ a receptacle having a base and a cover. A powder puff is supported within the receptacle which also contains a supply of powder. The receptacle parts are made as tight fitting as practicable for easy installation and removal of the cover, but it is well known that replacement of the cover on the lower portion of the receptacle may be accompanied with escape of powder. Materials from which the receptacles are customarily formed do not provide a sufficiently tight seal to prevent escape of scent from the powder. This is objectionable because once the powder box is opened the powder may lose substantially all of its scent before the major portion of the powder has been used.

An important object of the present invention is to overcome these difficulties and provide a powder box and dispenser including a puff, which device eliminates the objectionable escape of powder when the cover is replaced on the box, and which substantially prevents escape of scent from the powder even though the powder is used sparingly over a period of time.

Another object is to provide a powder box having an enclosed powder puff which acts resiliently upon a valve positioned in a container outlet to prevent escape of powder within the container.

A further object is to provide a device of this type in which the powder container is mounted on the receptacle cover so that the container may be grasped manually to raise the cover and then may be manually squeezed to eject a spray of powder onto the surface of the puff.

Other objects and advantages will appear more fully hereinafter.

In the drawings:

Figure 1 is a perspective view showing a preferred embodiment of my invention.

Figure 2 is a transverse sectional view taken substantially on the lines 2—2 as shown in Figure 1.

Figure 3 is a sectional elevation similar to Figure 2 showing the receptacle cover and powder container elevated with respect to the receptacle base and powder puff.

Figure 4 is a sectional detail taken substantially on the lines 4—4 as shown in Figure 3.

Figure 5 is a plan view of the valve assembly taken substantially in the direction shown by the lines 5—5 appearing in Figure 4.

Referring to the drawings, a receptacle generally designated 10 includes a base 11 having a bottom flange 12 and an upstanding circular wall 13. The receptacle 10 also includes the cover 14 which comprises an apertured disk 15 and a depending circular wall 16 which fits over the wall 13. The cover 14 can be lifted vertically to expose the powder puff 17 which is normally positioned within the base 11. This powder puff may be of any conventional type and is preferably provided with the usual cloth covering 18 and suitable filling material 19.

In accordance with my invention, I provide a container 20 formed wholly or partly of semi-plastic material such as, for example, polyethylene. This container is attached to the cover 14 by any convenient means. As shown in the drawings, the container extends through the central opening 21 in the cover 14 and is provided with an annular lip 22 which underlies the disk 15 of the cover to prevent disassembly. The material of the container 20 is sufficiently resilient to permit the lip to be distorted sufficiently to pass into the central opening 21. The wall thickness of the container 20 may be varied as desired in order to provide areas of minimum thickness for easy squeeze action by the finger tips. While the container is illustrated as being of generally spherical shape, any suitable or desirable shape may be employed.

The lower portion of the container 20 is provided with a hollow box 23 having a generally cylindrical opening 24. A valve assembly generally designated 25 is mounted in the opening 24. This valve assembly includes a seat member 26 formed of semi-resilient material and press-fitted into the opening 24. The seat member has a central passage 27 extending therethrough which terminates at its lower end in a conical surface 28. A valve member 29 is positioned in the passage 27 and is provided with an enlarged head 30 at its lower end having a conical surface 31 adapted to engage the surface 28 in sealing relationship. The upper end 32 of the valve member 29 is flattened so that its lateral dimensions prevent it from moving through the passage 27, and in this way the valve 29 is held in assembled relationship with respect to the seat member 26. Fins 33 integrally connect the outer wall 34 of the seat member with its inner wall 35.

The proportions of the container 20 and receptacle 10 are such that the head 30 of the valve 29 is engaged by the upper surface 36 of the powder puff 17 when the cover 14 is lowered into closing position on the base 11. The resilience of the powder puff 17 causes a closing force to be exerted upwardly on the valve head 30 to maintain the sealing surfaces 31 and 28 in contact. An effective seal is thus provided which is air-tight and prevents escape of scent from the body of powder 37 within the container 20. So long as the cover 14 remains in place on the base 11 the powder puff 17 holds the valve 29 in closed position.

The cover 14 may be raised from the base 11 by manually grasping the container 20 and lifting it. Powder does not immediately fall by gravity through the passage 27 and clearance between the surfaces 28 and 31 because these passageways are so restricted that powder does not fall freely therethrough. When it is desired to eject powder from the container 20 the latter is squeezed manually so that the container walls are deflected to a position such as that shown by the dot and dash lines 38 as shown in Figure 3. This squeezing raises the air pressure within the container sufficiently to expel a conical spray of powder downward from the valve head 30. This spray may be directed against the upper surface 36 of the puff 17. The amount of powder deposited on the puff may be accurately regulated by the manual squeezing action on the resilient container 20.

When the puff 17 is replaced in the base 11 and when the cover 14 is replaced in closing position, the usual escape of powder between the overlapping walls is eliminated. Since the body of powder 37 is confined within the container 20 and not within the receptacle 10, the escape of air from the interior of the receptacle 10 as the cover is replaced does not carry with it any appreciable quantity of powder, and so the objectionable spurting action of powder from the receptacle is avoided.

Having fully described my invention, it is to be understood that I do not wish to be limited to the details herein set forth, but my invention is of the full scope of the appended claims.

I claim:

1. In a device of the class described, the combination of: a receptacle, a powder applicator normally supported within said receptacle, a powder container having at least a portion thereof formed of relatively soft resilient material, means supporting the container upon the receptacle, the container having a discharge opening, a valve assembly including a movable valve element mounted in said opening to confine the contents of the container against escape, the movable valve element being normally engaged by the powder applicator whereby the movable valve element is maintained in closed position, the valve element being movable to open position upon separation of said container and powder applicator so that the contents of the container may be expelled by manual squeezing of said relatively soft portion of the container.

2. In a device of the class described, the combination of: a receptacle, a powder applicator normally supported within said receptacle, a powder container having at least a portion thereof formed of relatively soft resilient material, means supporting the container upon the receptacle, the container having a discharge opening, a vertically movable poppet valve mounted to close said opening to confine the contents of the container against escape, the head of the valve being engaged by the powder applicator whereby the movable valve is maintained in closed position, the valve being movable to open position upon separation of said container and powder applicator so that the contents of the container may be expelled by manual squeezing of said relatively soft portion of the container.

3. In a device of the class described, the combination of: a receptacle formed by first and second separable cooperating parts, a powder applicator normally supported within one of said parts, a powder container secured with respect to the other of said parts, the container having an opening, a valve assembly including a movable valve element mounted in said opening to confine the contents of the container against escape, a portion of the movable valve element being engaged by the powder applicator when said first and second parts of the receptacle are in cooperating position whereby the movable valve element is maintained in closed position, the valve element being movable to open position upon separation of said first and second receptacle parts.

4. In a device of the class described, the combination of: a receptacle formed by a base and a removable cover, a powder applicator normally supported within the base, a powder container secured with respect to the cover, the container having an opening, a valve assembly including a movable valve element mounted in said opening to confine the contents of the container against escape, a portion of the movable valve element being engaged by the powder applicator when the cover is in position upon the base whereby the movable valve element is maintained in closed position, the valve element being movable to open position upon separation of the cover and base.

5. In a device of the class described, the combination of: a receptacle formed by first and second separable cooperating parts, a powder applicator normally supported within one of said parts, a powder container secured with respect to the other of said parts, the container having at least a portion thereof formed of relatively soft resilient material, the container having an opening, a valve assembly including a movable valve element mounted in said opening to confine the contents of the container assembly against escape, a portion of the movable valve element being engaged by the powder applicator when said first and second parts of the receptacle are in cooperating position whereby the movable valve element is maintained in closed position, the valve element being movable to open position upon separation of said first and second receptacle parts so that the contents of the container may be expelled by manual squeezing of said relatively soft portion of the container.

6. In a device of the class described, the combination of: a base and a removable cover cooperating to form a receptacle, a powder puff normally supported within the base, a powder container secured to the cover, the container having a major portion extending above the cover and a minor portion extending into the receptacle, at least a part of said major portion of the container being formed of relatively soft resilient material, the minor portion of the container having an opening, a valve assembly including a movable valve element mounted in said opening to confine the contents of the container against escape, the movable valve element being engaged by the powder puff when the cover is in position upon the base whereby the movable valve element is maintained in closed position, the valve element being movable to open position upon separation of the cover and base so that the contents of the container may be expelled by manual squeezing of said relatively soft portion of the container.

7. In a device of the class described, the combination of: a receptacle formed by a base and a removable cover, a powder puff normally supported within the base, a powder container secured with respect to the cover, the container having at least a portion thereof formed of relatively soft resilient material, the container having an opening, a valve assembly including a vertically movable poppet valve mounted in said opening to confine the contents of the container against escape, the head of the valve being engaged by the powder puff when the cover is in position upon the base whereby the valve is maintained in closed position, the valve being movable to open position upon separation of the cover and base so that the contents of the container may be expelled by manual squeezing of said relatively soft portion of the container.

WALTON B. CRANE.

No references cited.